United States Patent [19]
Swenson

[11] Patent Number: 5,631,461

[45] Date of Patent: May 20, 1997

[54] APPARATUS FOR, AND METHODS OF, DETECTING THE DIRECTION AND FOCAL PROPERTIES OF NEUTRAL PARTICLE BEAMS

[75] Inventor: Donald A. Swenson, Albuquerque, N.M.

[73] Assignee: Science Applications International Corporation, San Diego, Calif.

[21] Appl. No.: 64,801

[22] Filed: Jun. 19, 1987

[51] Int. Cl.⁶ .............................. H01S 1/00; G01K 1/08; G01N 27/00
[52] U.S. Cl. ................. 250/251; 250/397; 324/71.3
[58] Field of Search ................... 250/251, 397; 324/71.3

[56] References Cited

U.S. PATENT DOCUMENTS

| | | | |
|---|---|---|---|
| 4,284,952 | 8/1981 | Fink | 324/71.3 |
| 4,700,068 | 10/1987 | McClung et al. | 250/251 |
| 4,701,616 | 10/1987 | West et al. | 250/251 |

*Primary Examiner*—Stephen C. Buczinski
*Attorney, Agent, or Firm*—Ellsworth R. Roston; Charles H. Schwartz

[57] ABSTRACT

A source wire is in the path of a neutral particle beam formed from positively and negatively charged particles (ions) and neutral particles (atoms). The source wire strips electrons from the negatively charged particles to neutralize these particles and strips electrons from the neutral particles to create positively charged particles. A magnetic field is perpendicular to the path of the particle movement. A detector wire downstream from the source wire detects the total particle flux. A magnetic field is perpendicular to the path of the particle movement. A variation, preferably cyclical, may be provided in at least one of (a) the characteristics of the magnetic field and (b) the positioning of the detector wire relative to the source wire in a direction perpendicular to the magnetic field and the particle movement. The resultant signal produced on the detector wire by the combined action of such magnetic field and/or detector wire movement is processed to indicate the characteristics, including direction, divergence and scattering of the neutral particle beam in a first direction. Second source and detector wires disposed in a direction respectively perpendicular to the first source and detector wires may be subjected to a second magnetic field perpendicular to the first magnetic field and to the particle path to determine the characteristics, including direction and divergence and scattering of the neutral particle beam in a second direction perpendicular to the first direction. A grid of source and detector wires may also be disposed in the first and second directions to enhance the indications of the characteristics, including direction, divergence and scattering, of the neutral particle beam in the first and second directions.

16 Claims, 4 Drawing Sheets

FIG. 1
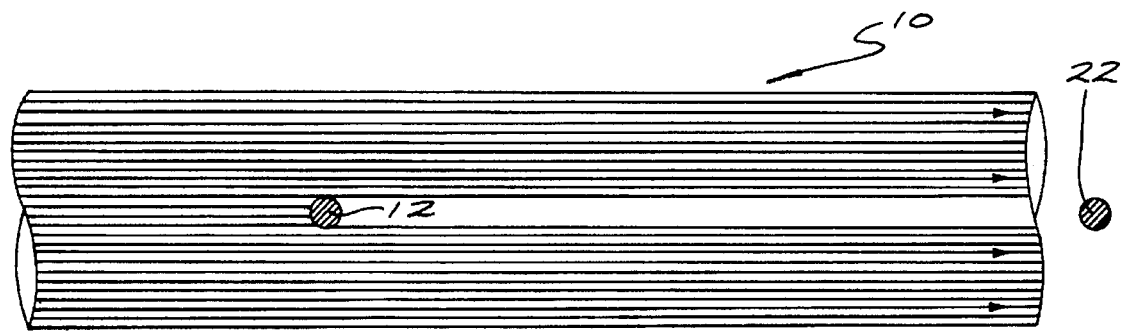
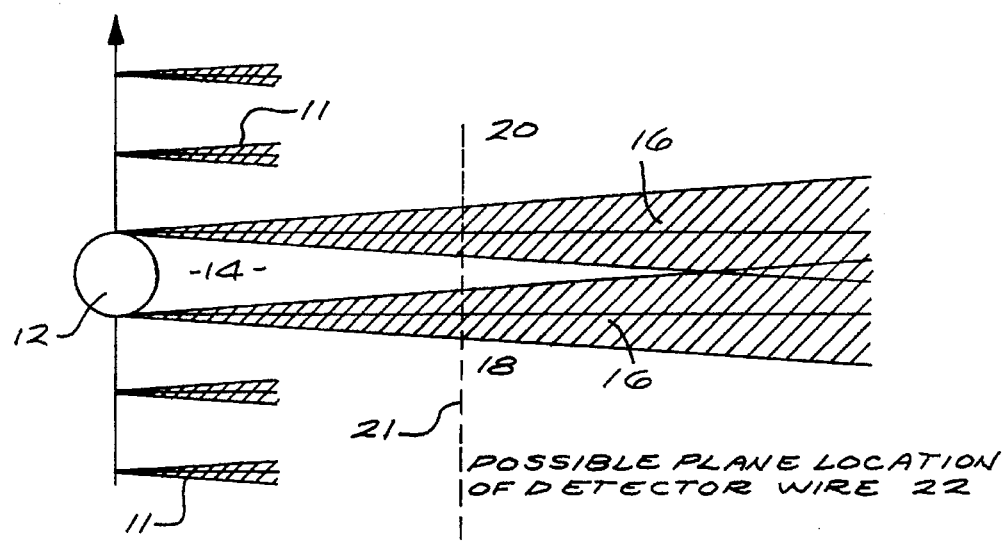
POSSIBLE PLANE LOCATION OF DETECTOR WIRE 22
FIG. 2

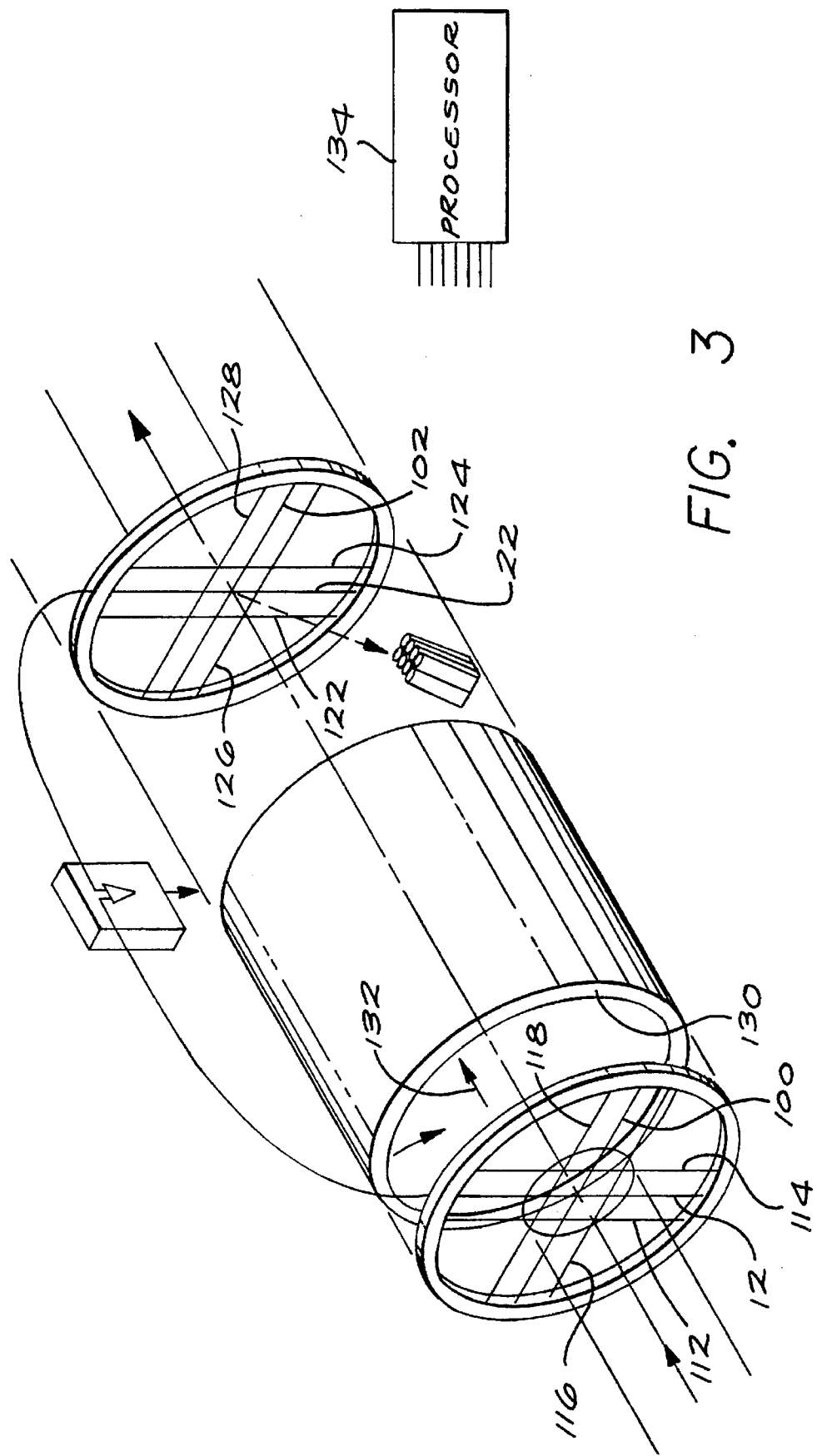

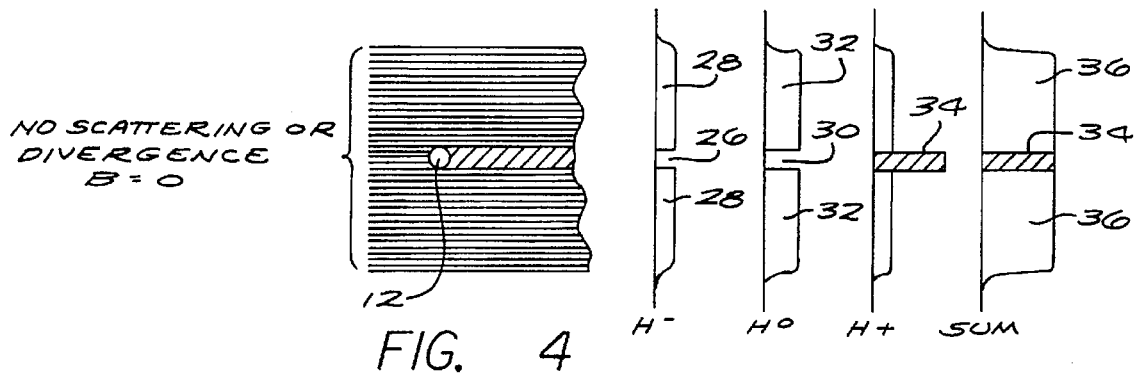
FIG. 4 NO SCATTERING OR DIVERGENCE B = 0
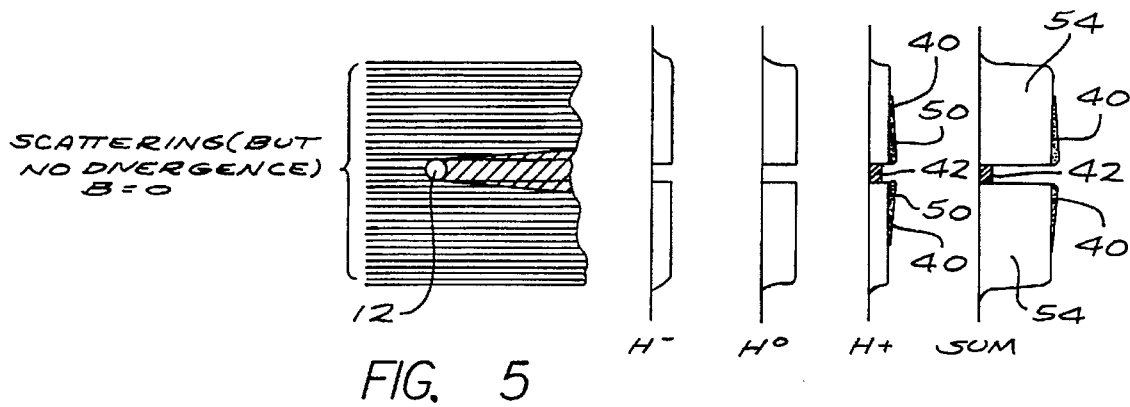
FIG. 5 SCATTERING (BUT NO DIVERGENCE) B = 0
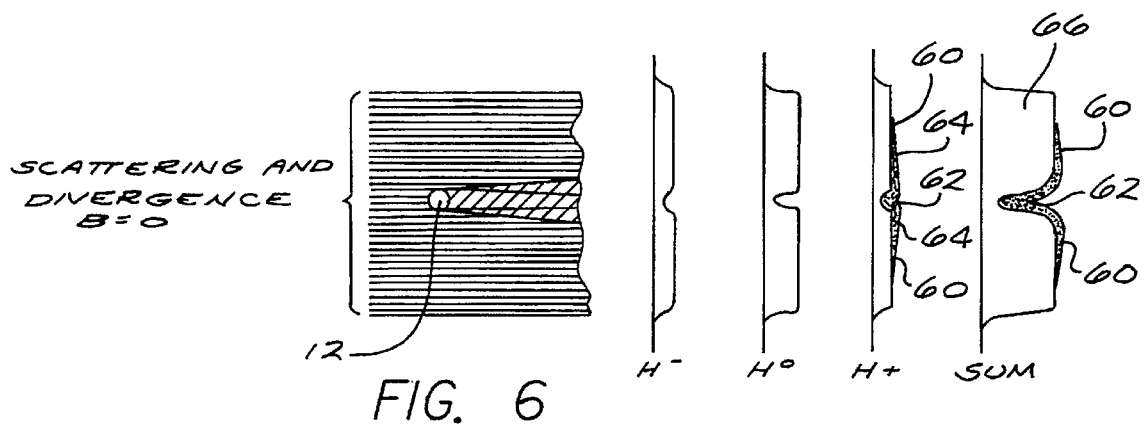
FIG. 6 SCATTERING AND DIVERGENCE B = 0

APPARATUS FOR, AND METHODS OF, DETECTING THE DIRECTION AND FOCAL PROPERTIES OF NEUTRAL PARTICLE BEAMS

This invention relates to systems for, and methods of, determining the characteristics of a neutral particle beam. The invention also relates to systems for, and methods of, determining the characteristics, including the direction, divergence and scattering, of a neutral particle beam without disturbing the characteristics of the beam.

The generation and use of neutral particle beams have received considerable attention in recent years. For example, the generation and use of neutral particle beams are receiving attention as a deterrent to any violation of the air space of a defending country by an aggressive country. Such neutral particle beams are advantageous in that they can be provided with considerable energy and can be directed through great distances with substantially pinpoint accuracies.

Both the generator of the neutral particle beams and the defender against such beams may wish to know the characteristics of such generated beams. For example, they may wish to know the direction of such beams and may also wish to know other characteristics of such beams such as the scattering and divergence of such beams. They may wish to know these characteristics without disturbing the beam. Unless these characteristics are known, it is difficult to obtain the full benefits of the neutral particle beam in defending against aggressors.

A considerable effort has been made in recent years, and significant amounts of money have been expended, to develop systems for, and methods of, determining the characteristics of a neutral particle beam without disturbing the characteristics of the beam. In spite of such considerable efforts and such significant expenditures of money, little real progress has been made toward the solution of this problem.

This invention provides systems for, and methods of, determining the characteristics of a neutral particle beam. The system and method of this invention determine the direction, divergence and scattering of a neutral particle beam in a simple, reliable and straight forward manner. The system and method of this invention provide a determination of these characteristics with minimal disturbance to the neutral particle beam.

In one embodiment of the invention, a source wire is disposed in the path of a neutral particle beam formed from positively and negatively charged particles (ions) and neutral particles (atoms). The source wire may have the thickness in the order of a human hair. The source wire strips electrons from the negatively charged particles to neutralize these particles and strips electrons from the neutral paraticles to create positively charged particles. A magnetic field is perpendicular to the path of the particle movement. A detector wire preferably having a thickness in the order of a human hair and disposed downstream from the source wire detects the total particle flux.

A variation, preferably cyclical, may be provided in at least one of (a) the characteristics of the magnetic field and (b) the positioning of the detector wire relative to the source wire in a direction perpendicular to the magnetic field and the particle movement. The resultant signal produced on the detector wire by the combined action of such magnetic field and/or detector wire movement is processed to indicate the characteristics, including the direction, divergence and scattering of the neutral particle beam in a first direction.

Second source and detector wires disposed in a direction respectively perpendicular to the first source and detector wires may be subjected to a second magnetic field perpendicular to the first magnetic field and to the particle path to determine the characteristics, including direction, divergence and scattering of the neutral particle beam in a second direction perpendicular to the first direction. A grid of source and detector wires may also be disposed in the first and second directions to enhance the indications of the characteristics, including direction, divergence scattering, of the neutral particle beam in the first and second directions.

In the drawings:

FIG. 1 is a schematic diagram of the elementary embodiment of an invention for determining the characteristics of a neutral particle beam;

FIG. 2 is a schematic diagram illustrating the effect on the embodiment shown in FIG. 1 when a detector wire in such embodiment is displaced different distances from a source wire;

FIG. 3 is a schematic diagram, illustrating a practical embodiment of the invention involving 3 horizontal and 3 vertical measurement planes;

FIG. 4 is a schematic diagram of the operation of the embodiment of FIG. 2 on an idealistic basis when the beam has ideal conditions and no magnetic field is included in such embodiment;

FIG. 5 is a schematic diagram of the operation of the embodiment of FIG. 4 when the beam has scattering (but no divergence) and no magnetic field is included in such embodiment;

FIG. 6 is a schematic diagram of the operation of the embodiment of FIG. 4 when the beam has scattering and divergence and no magnetic field is included in such embodiment.

Figure 7:
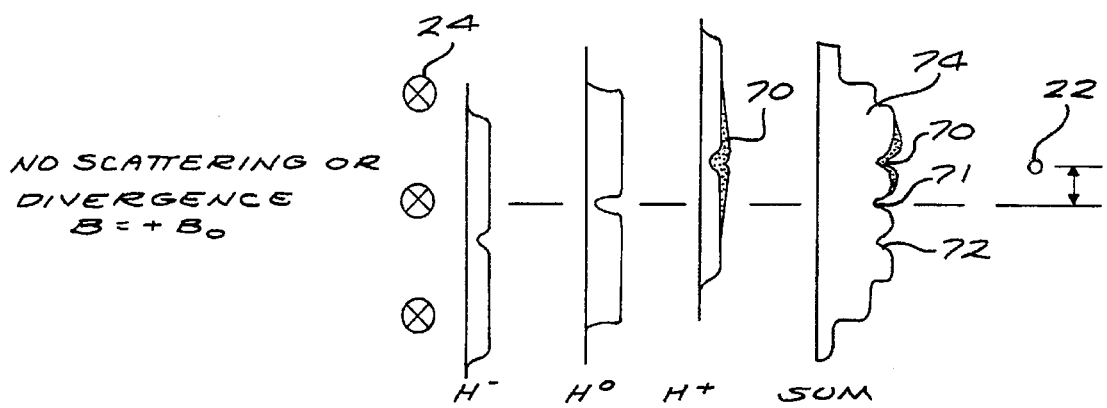
FIG. 7, 8 and 9 are schematic diagrams respectively corresponding to the embodiments of FIGS. 4, 5 and 6 and illustrate the effects on the beam from the inclusion of the magnetic field in the embodiment.

In one embodiment of the invention, a neutral particle beam is generally indicated at 10. The neutral particle beam has neutral particles, positively charged particles and negatively charged particles. In a general sense, approximately one half (½) of the particles in the beam may be neutral, one quarter (¼) of the particles in the beam may be positively charged and one quarter (¼) of the particles in the beam may be negatively charged. The beam is called a "neutral particle beam" because of the significant neutral component that it contains.

It is generally desired to transmit the beam with high precision through great distances. For example, it may be desired to transmit the beam through hundreds of miles and to direct the beam to a position at the distant position. This position often has to be quite precise. For example, a deviation of the beam by more than a few feet from the distant position may not be acceptable.

This invention provides a system for detecting the characteristics of the neutral particle beam. The system includes a source wire 12 disposed in the path of the beam 10. The source wire 12 may have a thickness not greater than that of a human hair. For example, the thickness of the source wire 12 may be no more than a few hundredths of a millimeter. Because of this, the inclusion of the source wire 12 in the path of the neutral particle beam 10 has a minimal effect, from a practical standpoint, on the characteristics of the beam.

As shown in FIG. 2 in an enlarged and exaggerated form the beam 10 may have angular rays such as indicated at 11. As shown on an enlarged and exaggerated basis in FIG. 2, the source wire 12 casts a shadow on the beam 10. In an area 14, the shadow cast by the source wire 12 on the beam 10 is complete. In an area 16, the source wire 12 casts a partial, but not a complete shadow. The source wire 12 does not cast any shadow on the beam 10 in areas 18 and 20. As a result, a detector wire 12 is preferably disposed within the area 14 at a planar location indicated by a line 21. The detector wire 22 preferably has a thickness corresponding to that of the source wire 12. The detector wire 22 preferably extends in a direction substantially perpendicular to the direction of movement of the beam 10. The distance between the source wire 12 and the detector may be in the order of several meters.

A magnetic field 24 may be applied to the neutral particle beam 10. This is indicated by the designation $B=B_0$ in FIGS. 5, 8 and 9. Preferably, the magnetic field 24 is in a direction substantially perpendicular to the direction of movement of the beam 10. For example, in the embodiment shown in FIG. 1, the magnetic field 24 may be in a direction substantially perpendicular to the plane of the paper. This magnetic field is also indicated by "0" in FIGS. 7, 8 and 9.

FIGS. 4, 5 and 6 illustrate the effect of the source wire 12 on the neutral particle beam 10 when the magnetic field 24 is zero and the neutral particle beech is idealized. As the particles in the beam 10 pass through the source wire 12, the negatively charged ions in the beam lose electrons so that the particles become positive lions. This is illustrated at 26 in FIG. 4 in the portion of the beam in the shadow of the source wire 12. This is in contrast to the portion of the beam not in the shadow of the beam as indicated at 28 in FIG. 4. In this portion of the beam 10, the negatively charged particles do not lose electrons.

Similarly, electrons are lost by the neutral particles as they pass through the beam. This is indicated at 30 in FIG. 4. This causes these ions in the shadow of the source wire 12 to become positively charged. This is in contrast to the portion of the beam not in the shadow of the source wire 12, as indicated at 32 in FIG. 4. This causes the number of positively charged particles in the shadow of the source wire 12 after passage of the beam 10 through the source wire to be greater than the number of positively charged particles in such portion of the beam before interaction of the beam with the source wire 12. This indicated by a cross-hatched area 34 in FIG. 4. The resultant beam after the operation of the source wire 12 on the beam 10 is shown at 36 in FIG. 4.

FIG. 4 illustrate the effect of the source wire 12 on the beam when the magnetic field 24 is zero.

FIG. 5 is a view similar to that shown in FIG. 4 but illustrates the effect on the neutral particle beam 10 when the beam suffer some scattering (in the source wire 12). The effect of the source wire 12 on the scattered particles in the beam 10 is illustrated by the diverging portions 40 on each side of the shadow 42 produced by the idealized beam. As in FIG. 4, FIG. 5 illustrates the effect of the source wire 12 on the beam when the magnetic field 24 is zero.

The response patterns shown in FIG. 5 are similar in many respects to the response patterns shown in FIG. 4. However, instead of being concentrated in position as at 34 in FIG. 4, the positively charged particles in FIG. 5 tend to become scattered over an area perpendicular to the direction of movement of the beam 10. This is indicated by a speckled area 50 in FIG. 5. The relative concentration of the positively charged particles at the different positions as a result of such scattering is illustrated by the horizontal width of the speckled area 50 at the different vertical positions in FIG. 5. The resultant beam after the operation of the source wire 12 on the beam 10 is shown at 54 in FIG. 5.

FIG. 6 is a view similar to that shown in FIGS. 4 and 5 but illustrates the effect on the neutral particle beam 10 when the beam has scattering and divergence. The effect of the source wire 12 on the scattered particles in the beam 10 is illustrated by diverging portions 60 on each side of a shadow 62 produced by the idealized beam. As in FIGS. 4 and 5, FIG. 6 illustrates the effect of the source wire 12 on the beam when the magnetic field is zero.

The response patterns shown in FIG. 6 are similar in many respects to the response patterns shown in FIG. 5. However, the positively charged particles tend to be scattered even more in FIG. 6 than in FIG. 5. This results from the additional effect of the divergence of the beam 10. The scattering of the positively charged particles is illustrated in FIG. 6 by a speckled area 64. The relative concentration of the positively charged particles at the different positions as a result of such divergence and scattering is illustrated by the horizontal width of the speckled area at the different vertical positions in FIG. 6. The resultant beam after the operation of the source wire on the beam is shown at 66 in FIG. 6.

Figure 8:
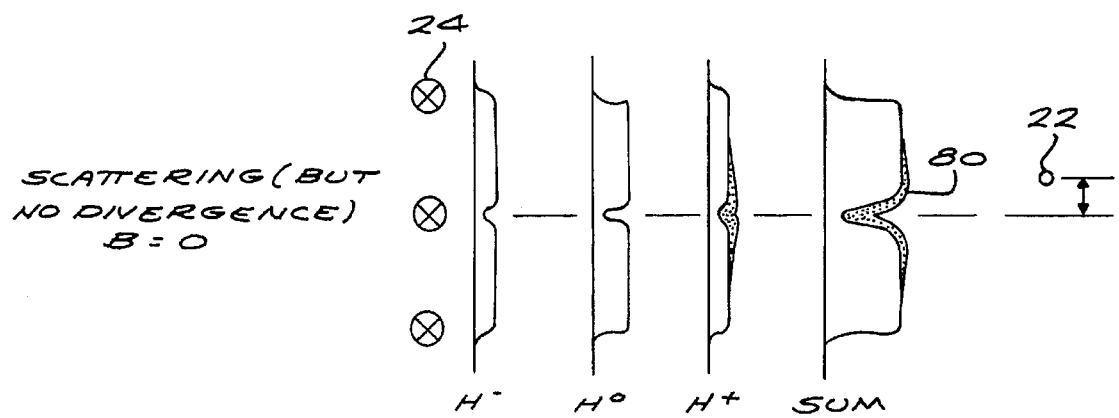
Figure 9:
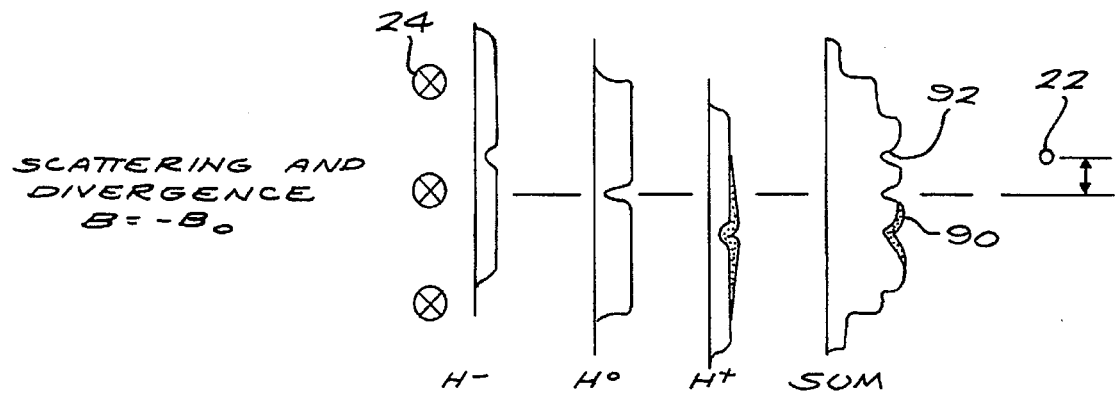

FIGS. 7, 8 and 9 illustrate the effect on the neutral particle beam 10 of a magnetic field 24. In FIG. 7, 7, the magnetic field is defined as $B=+B_0$ and extends into the plane of the paper. This is indicated at at by an "X" in a circle in FIGS. 7, 8 and 9 to identify the tail of an arrow. As will be seen, the positive ions in the neutral particle beam 10 are shifted in a direction perpendicular to the direction of the magnetic field 24. This is illustrated by a speckled area, as at 70 in FIG. 7, where the positive ions are shown above the axis of the neutral particle beam. In FIG. 7, the positive ions are spread in space because the beam is assumed to have divergence and scattering as shown in FIG. 6.

Since the positive ions are shifted upwardly in space in FIG. 7, the negative ions are shifted downwardly as indicated at 72 in FIG. 7. This results from the action of the magnetic field 24 on the negative ions. The resultant disposition of the beam in space after the action of the source wire 12 and the: magnetic field 24 on the beam is indicated at 74 in FIG. 7, where three distinct shadows are seen corresponding to a shadow in the positive ion flux of 70, a shadow in the neutral ion flux 71, and a shadow in the negative ion flux 72.

FIG. 8 illustrates the disposition of the neutral particle beam 10 in space when the magnitude of the magnetic field 24 is decreased progressively from $+B_0$ to 0. As will be seen, the positioning of the positive ions 80 in FIG. 8 corresponds to the positioning of the speckled area 60 in FIG. 6.

FIG. 9 illustrates the effect on the neutral particle beam 10 of the magnetic field 24 when the magnetic field has become negative and has a value of $B=-B_0$. As will be seen at 90 in FIG. 9, the positive particles have been shifted downwardly by the combined effect of the charge of the particles and the magnetic field. Similarly, the negatively charged particles have been shifted upwardly, as indicated at 92 in FIG. 9. FIG. 9 is similar to FIGS. 7 and 8 in that the neutral particle beam 10 is assumed to have divergence and scattering.

When the magnetic field is oscillated between $+B_0$ and $-B_0$ through a value of 0, an oscillatory signal will be produced at the detector wire 22. The magnitude of this signal indicates the strength of the total ion flux in the particle beam. Other characteristics of the signal indicate the scattering and divergence of the neutral particle beam 10. For example, the characteristics of the signal (such as the horizontal width of the speckled area) 70 in FIG. 7 indicate the divergence and scattering of the neutral particle beam 10.

Instead of varying the characteristics of the magnetic field 24, the position of the detector wire 22 relative to the source wire 12 may be varied. For example, the source wire 22 may be moved upwardly and downwardly in the embodiments shown in FIGS. 4–9. Alternatively, a combination of the movement of the detector wire 22 and the variation in the magnetic field 24 may be provided.

As will be appreciated, the characteristic of the neutral particle beam 10 in a direction perpendicular to that shown in FIG. 1 can be determined by disposing another source wire in a direction perpendicular to the source wire 12 and the detector wire 22 and perpendicular to the magnetic field 24 in FIGS. 7–9 and by disposing a source wire perpendicular to the source wire 22 and the magnetic field 24 in FIGS. 7–9. For example, a source wire 100 and a detector wire 102 can be disposed substantially parallel to each other in FIG. 3 and substantially perpendicular to the source wire 12 and the detector wire 22 in FIG. 3. The source wire 100 and the detector wire 102 are accordingly operative to determine the characteristics of the beam 10 in a direction perpendicular to that determined by the source wire 12 and the detector wire 22.

Actually, the embodiment shown in FIG. 3 may include source wires 112 and 114 parallel to the source wire 12 and spaced by a particular distance from the source wire 12. Preferably the source wires 12, 112 and 114 have a planar relationship. The embodiment shown in FIG. 3 may also include detector wires 122 and 124 parallel to the detector wire 22 and spaced by the particular distance from the detector wire 22. Preferably the detector wires 22, 122 and 124 have a planar relationship. Similarly, source wires 116 and 118 and detector wires 126 and 128 may have respectively the same relationship to the source wire 100 and the detector wire 102 as the relationship between the source wires 12, 112 and 114 and the detector wires 22, 122 and 124. All of the source wires are preferably in a single plane and all of the detector wires are preferably in a single plane. The magnetic field 24 may be produced by a winding 130 in FIG. 3. The direction of the magnetic field is accordingly in a direction indicated by an arrow 132 in FIG. 3.

By providing the source wires 12, 112 and 114 and the detector wires 22, 122 and 124, an average of the measurements in the three (3) wires can be taken to indicate the direction of the neutral particle beam 10. The differences in the measurements in the three (3) wires can be used to indicate the extent to which the beam is being defocussed. Similar determinations can be provided in a perpendicular direction by the operation of the source wires 100, 116 and 118 and the detector wires 102, 126 and 128. Such determinations may be made by a processor 134 which may constitute a microprocessor and which may be connected to receive the signals produced in the detector wires 22, 122 and 124 and the detector wires 102, 126 and 128.

The apparatus disclosed above has certain important advantages. It is able to measure the direction of a neutral particle beam 10 without disturbing the characteristics of the beam. The apparatus is also able to determine such characteristics of the beam such as the divergence and scattering of the beam without disturbing the characteristics of the beam. The apparatus provides such an operation in a simple and reliable manner.

The discussion has proceeded above on the basis that the characteristics of the neutral particle beam 10 are determined by measuring the charges of the particles in the beam. It will be appreciated that the characteristics of the beam can also be determined by measuring the photoemission from the detector wires such as the detector wire 22. This may actually constitute a preferred method of detecting the characteristics of the neutral particle beam 10.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for determining the characteristics of a neutral particle beam having negatively charged particles, neutral particles and positively charged particles, a source wire disposed in the path of the neutral particle beam to strip electrons from the negatively charged particles and the neutral particles, a detector wire disposed in the path of the neutron particle beam downstream from the source wire to produce signals in accordance with the total particle flux, means for producing a magnetic field at a position between the source wire and the detector wire in a direction substantially perpendicular to the direction of the neutral particle beam, means for providing at least one of the following: (1) varying the position of detector wire relative to the source wire in a direction substantially perpendicular to the direction of movement of the neutron particle beam and the direction of the magnetic field and (2) varying the characteristics of the magnetic field, and means for processing the signals produced on the detector wire at progressive instants of time to indicate the characteristics of the neutral particle beam.

2. In a combination as set forth in claim 1, the source wire having a thickness of approximately five hundredths millimeter (0.05 mm) and the detector wire having a thickness of approximately five hundredths millimeter (0.05 mm) and the distance between the source wire and the detector wire being in the order of a few meters.

3. In a combination as set forth in claim 1, a second source wire disposed in the path of the neutron particle beam in a direction substantially perpendicular to the first source wire, a second detector wire disposed in the path of the neutral particle beam downstream from the second source wire and substantially perpendicular to the second detector wire, means for providing for at least one of the following: (1) moving the second detector wire relative to the second source wire in a direction substantially perpendicular to the direction of the neutral particle beam and the direction of the magnetic field and (2) varying the characteristics of the magnetic field, and means for processing the signals produced in the second detector wire at progressive instants of time to indicate additional characteristics of the neutral particle beam.

4. In a combination as set forth in claim 1, second source and detector wires respectively disposed in spaced and parallel relationship to the first source and detector wires, the second detector wire being movable relative to the second source wires in synchronous relationship with the movement of the first detector wire relative to the first source wire, means for processing the signals produced in the first and second detector wires at progressive positions in the direction of movement of the first and second detector wire relative to the first and second source wires, to indicate further characteristics of the neutron particle beam.

5. In combination for determining the characteristics of a neutral particle beam having negatively charged particles, neutral particles and positively charged particles, a source wire disposed in the path of the neutral particle beam to neutralize the negatively charged particles and to remove electrons from the neutral particles, a detector wire disposed in the path of the neutron particle beam downstream from the source wire, means for creating a magnetic field at a position between the source wire and the detector wire in a direction substantially perpendicular to the neutral particle beam, and means for varying at least one of (1) the characteristics of the magnetic field and (2) the positioning of the detector wire relative to the source wire in a direction substantially perpendicular to the neutral particle beam and the magnetic field.

6. In a combination as set forth in claim 5, the varying means operating on a cyclic basis representing progressive changes in the magnitude, and changes in the polarity, of at least one of (1) the magnetic field and (2) the positioning of the detector wire relative to the source wire in a direction substantially perpendicular to the neutral particle beam and the magnetic field.

7. In a combination as set forth in claim 6, the distance between the source wire and the detector wire being in the order of several meters and the thickness of the source wire and the detector wire being in the order of a few hundredths of millimeters.

8. In a combination as set forth in claim 5, the processing means being operative to indicate the scattering and diffusion of the neutral particle beam.

9. In combination for determining the characteristics of a neutral particle beam having negatively charged particles, neutral particles and positively charged particles, a plurality of source wires disposed in spaced and substantially parallel relationship to one another in the path of the neutral particle beam, a plurality of detector wires disposed ill spaced and substantially parallel relationship to one another in the path of the neutral particle beam and in substantially parallel relationship to the source wires in the plurality, means for producing a magnetic field at a position between the source wires and the detector wires in a direction substantially perpendicular to the neutral particle beam, means for providing at least one of the following to obtain signals of variable characteristics on the detector wires (1) varying the position of the detector wires relative to the source wires in a direction substantially perpendicular to the neutral particle beam and the magnetic field and (2) varying the magnetic field, and means for processing the signals from the detector wires to indicate the characteristics of the neutral particle beam in the plane of the plurality of the source wires.

10. In a combination as set forth in claim 9, a second plurality of source wires and a second plurality of detector wires having substantially the same relationship as the first plurality of source wires and the first plurality of detector wires but disposed in perpendicular relationship to the source wires and the detector wires in the first pluralities, the processing means being operative to process the signals from the detector wires in the second plurality to indicate the characteristic of the neutral particle field in the plane of the second plurality of source wires.

11. In a combination as set forth in claim 9, the source wires in the plurality having a plane relationship and the detector wires in the plurality having a planar relationship displaced from, but parallel to, the planar relationship of the source wires.

12. In a combination as set forth in claim 10, the source wires in the first and second pluralities having a common planar relationship and the detector wires in the first and second pluralities having a common planar relationship displaced from, but parallel to, the planar relationship of the source wires in the first and second pluralities.

13. A method of determining the characteristics of a neutral particle beam having negatively charged particles, neutral particles and positively charged particles, disposing a source wire in the path of the neutral particle beam, providing a magnetic field on the beam, in a direction substantially perpendicular to the beam, at positions downstream from the source wire in the direction of the beam, determining the effect of the first source wire and the magnetic field on the characteristics of the beam in a first plane downstream from the source wire, the first plane being substantially perpendicular to the beam and the magnetic field, varying at least one of: (1) the characteristics of the magnetic field and (2) the position in the first plane of determining the characteristics of the beam.

14. A method as set forth in claim 13 including the steps of:

disposing a second source, in the path of the neutral particle beam, in a direction perpendicular to the first source wire and the magnetic field, determining the effect of the second source wire and the magnetic field on the characteristics of the beam in a second plane downstream from the beam, the second plane being substantially perpendicular to the first plane and the magnetic field, and varying at least one of: (1) the characteristics of the magnetic field and (2) the position in the second plane of determining the characteristics of the beam.

15. A method as set forth in claim 13 wherein additional source wires are disposed in the path of the neutral particular beam in spaced and substantially parallel relationship to the first source wire and wherein signals are produced in representation of the effects on the beam of the first source wire and the additional source wires and the magnetic field and wherein the signals are processed to determine the characteristics of the beam in the first plane.

16. A method as set forth in claim 14 wherein first additional source wires are disposed in the path of the neutral particle beam in spaced and substantially parallel relationship to the first source wire and wherein first signals are produced in representation of the effects on the beam of the first source wire and the first additional source wires and and the magnetic field and wherein the first signals are processed to determine the characteristics of the beam in the first plane, and wherein second additional source wires are disposed in the path of the neutral particle beam in spaced and substantially parallel relationship to the second source wire and wherein second signals are produced in representation of the effects on the beam of the second source wire and the second additional source wires and the magnetic field and wherein the second signals are processed to determine the characteristics of the beam in the second plane.

* * * * *